United States Patent [19]

Rudolph

[11] Patent Number: 5,187,880
[45] Date of Patent: Feb. 23, 1993

[54] CENTRIFUGAL DRYER FOR SEPARATION OF SURFACE WATER FROM PLASTIC GRANULES

[75] Inventor: Joachim Rudolph, Weilder Stadt, Fed. Rep. of Germany

[73] Assignee: Werner & Pfleiderer GmbH, Stuttgart, Fed. Rep. of Germany

[21] Appl. No.: 821,487

[22] Filed: Jan. 15, 1992

[30] Foreign Application Priority Data

Feb. 28, 1991 [DE] Fed. Rep. of Germany ....... 4106248

[51] Int. Cl.⁵ .............................................. F25B 5/08
[52] U.S. Cl. ........................................................ 34/8
[58] Field of Search ...................... 34/58, 8, 182, 181; 494/35, 42, 43

[56] References Cited

U.S. PATENT DOCUMENTS 4,565,015 1/1986 Hundley ............................. 34/58 X
4,570,359 2/1986 Rudolph ................................. 34/58

Primary Examiner—Henry A. Bennet
Attorney, Agent, or Firm—Ladas & Parry

[57] ABSTRACT

A rotor (2) surrounded by a strainer basket (3) is arranged vertically in a housing (1). Conveyor blades (7) arranged one above the other are distributed over the rotor (2) to convey plastic granules from a product inlet (14) arranged at the bottom of the housing to a discharge unit (15). A fan (19) is disposed in a discharge hood (16) and it has ejector blades (21) for assisting the radial discharge of the granules into unit (15). In order to change the residence time of the plastic granules in the dryer, a change in pressure is produced in the centrifugal dryer by replacing the fan with one having ejector blades whose outer diameter and/or length is different, the diameter of rotor (2) and its conveyor blades (7) being kept the same.

13 Claims, 2 Drawing Sheets

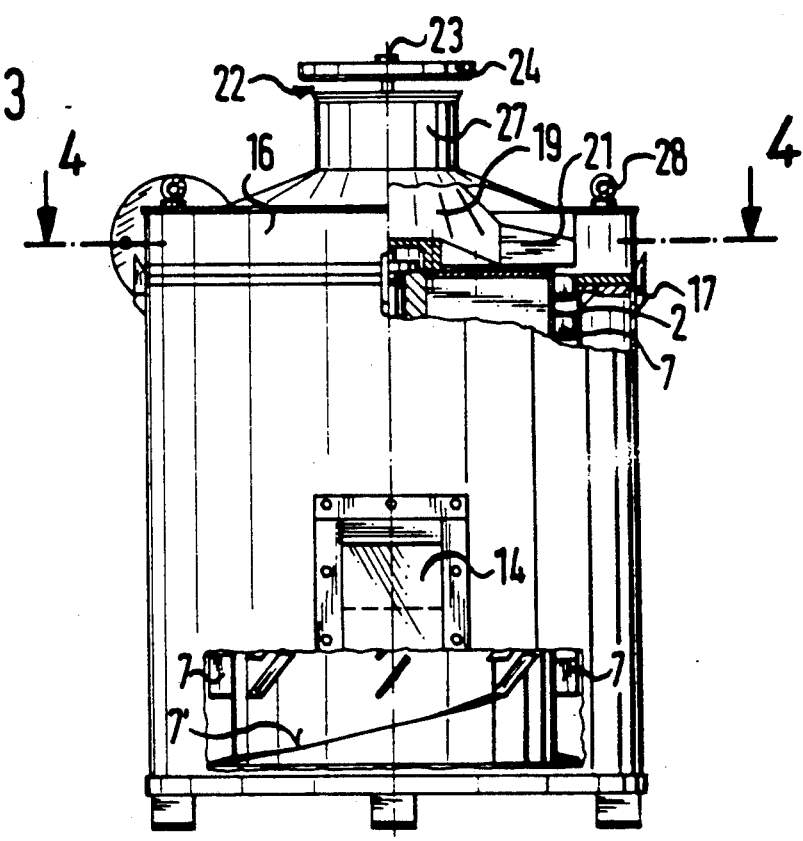
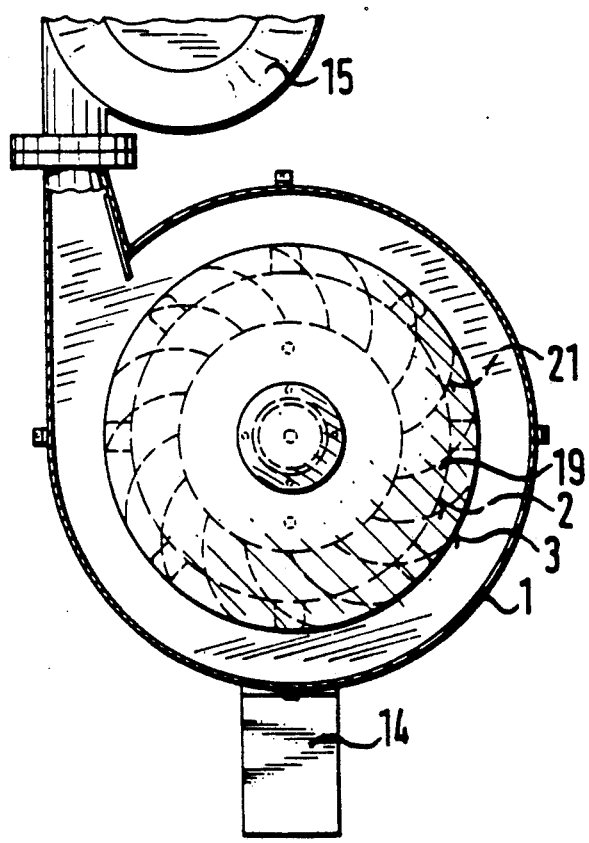

CENTRIFUGAL DRYER FOR SEPARATION OF SURFACE WATER FROM PLASTIC GRANULES

FIELD OF THE INVENTION

The invention relates to a centrifugal dryer for separation of surface water from plastic granules and particularly, to a simple method and apparatus for controlling residence time of the granules in the dryer.

BACKGROUND AND PRIOR ART

In the production of plastic granules, centrifugal dryers are used for separating the granulation water from the granules. These known centrifugal dryers essentially consist of a rotor surrounded by a strainer basket arranged vertically in a housing. The wet or moist granules are fed into the bottom of the dryer and delivered at the top at a product outlet by conveyor blades arranged on the rotor. In the region of the product outlet is arranged a fan provided with ejector blades for assisting the discharge of dry plastic granules. The water is separated by the strainer of the strainer basket. An upwardly directed current of air is produced by the conveyer blades by rotating the rotor and this is further intensified by the suction effect of the uniform size ejector blades of the fan. In order to reduce the suction effect of the fan, it is known from CH-PS 620 859, for the drying of light foil strips, to adjust the magnitude of air aspirated from the top by the fan by means of adjustable air slots, depending on the type of material to be dried.

In this way only the quantity of air aspirated at the top for the discharge fan is controlled; different pressure stages for considerably longer or shorter residence times of the granules in the centrifugal dryer cannot be realized in this way.

The residence time of the granules in the dryer can be adjusted according to DE-OS 31 20 792 by changing the angle of the conveyor blades, by providing a stepwise or conical configuration of the rotor and/or by changing the rotor speed. For this purpose, of course, considerable modifications to the dryer are necessary. A high abrasion of the drying material is produced at the transition regions of the individual steps in the case of the stepwise configuration.

By improving the preliminary separation of water after the granulating process the centrifugal dryer often no longer must assume the primary task of separating large quantities of water, but only of separating the residual moisture from the plastic granules. If the plastic granules have been substantially dewatered in advance, problems occur in introducing the granules into the centrifugal dryer, since the transport water is now absent.

SUMMARY OF THE INVENTION

An object of the invention is to provide a centrifugal dryer which makes possible in a small compact construction, high input capacity and high throughput for plastic granules which have been intensely dewatered in advance with minimum abrasion and optimal residence time, and which can be employed without high equipment cost for different types of plastics or wet plastic granules.

This, and other objects, are achieved according to the invention by supporting the fan at the product outlet in an easily and rapidly replaceable manner so that fans of different size ejector blades can be employed to effect selected suction pressure in the dryer and consequent residence time of the plastic granules therein while retaining for the same rotor and its conveyor blades within the dryer. The different sizes of the blades of the fans can be obtained by providing different diameters for the blades or different radial lengths of the blades or a combination of both.

By modifying the outer diameter and/or radial length of the discharge blades of the fan, it is possible in a simple way to modify the pressure in the dryer by a positive to negative pressure without changing the rotor and its conveyor blades or modifying the rotor speed. In this way, the residence times of the granules to be dried can be adjusted optimally with small abrasion.

A more effective input and rapid throughput of granules which have been intensely dewatered in advance is obtained, in a particularly favorable manner, by introducing the granules at the bottom of the dryer on helical sheet metal strips extending from the lowermost conveyor blades on the rotor to the bottom of the rotor. A suction pressure is produced in the inlet region of the dryer by suitably forming the ejector blades of the fan, which provides for a rapid, smooth, intense treatment of granules delivered in the flow of air, which operates in conjunction with the screw conveyor action of the lower conveyor blades.

In one embodiment of the invention in which the fan has ejector blades of greater radial length, an increase in the residence time of the granules in the dryer is produced by establishing a counter-pressure in the central region of the dryer and thus a maximal dewatering of the granules.

According to the feature of the invention regarding quick release and replacement of the fan, a rapid changing of the fan and thus an optimal residence time of the respective granules in the dryer can be achieved advantageously.

BRIEF DESCRIPTION OF THE FIGURES OF THE DRAWING

FIG. 3 is a view of the dryer rotated 90° from the position in FIG. 1 with a partially broken-away housing showing a fan according to another embodiment thereof.

FIG. 4 is a section taken along line 3-3 in FIG. 3.

DETAILED DESCRIPTION OF PREFERRED EMBODIMENTS

Figure 1:
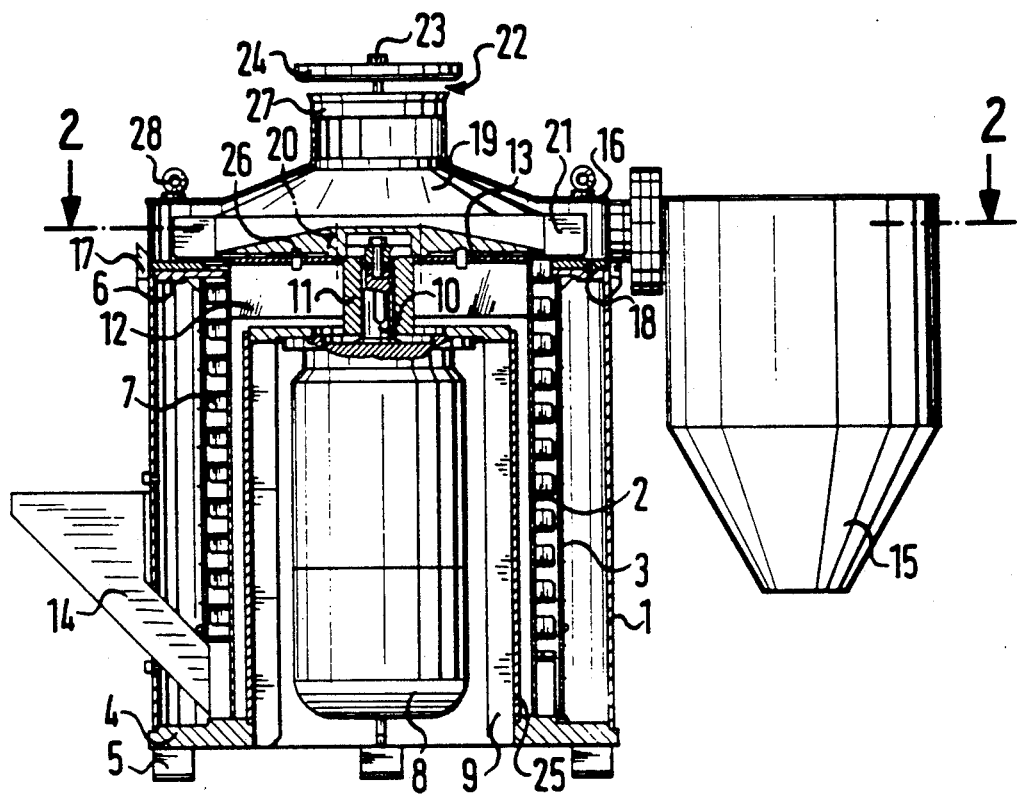
FIG. 1 is a diagrammatic longitudinal section through a centrifugal dryer according to the invention.

The centrifugal dryer according to the invention consists of a cylindrical sheet-metal housing or jacket 1, in which a rotor 2 is arranged vertically and surrounded by a strainer basket 3. At the bottom, the jacket 1 is connected to a base 4 provided with feet 5 and the jacket is joined at its top with an annular disk 6. The strainer basket 3 closely surrounds conveyor blades 7 on the periphery of rotor 2 and is clamped between annular disk 6 and base 4. A motor 8 extends centrally in jacket 1 and is secured to base 4 by an inner sheet-metal jacket 25 reinforced with struts 9. Rotor 2 is drivingly connected to drive shaft 10 of motor 8 via a bushing 11 seated on drive shaft 10, which is joined by an arm 12 to the inner wall of rotor 2. Rotor 2 is closed on top by a cover 13.

Figure 2:
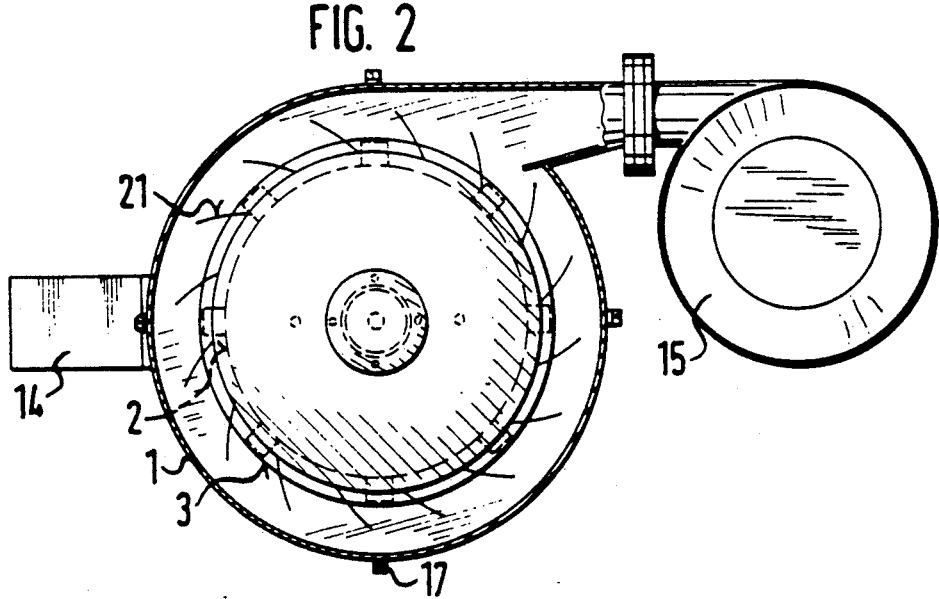
FIG. 2 is a section taken along line 2-2 in FIG. 1.

An inlet 14 for granules is in the form of a chute which extends through sheet metal jacket 1 and strainer basket 3 to supply moist granules continuously and directly to the lowermost conveyor blades 7 on the rotor by means of sheet-metal strips 7' connected to the bottom edges of blades 7 and extending helically downwards toward the base 4. Previously intensely dewatered granules are smoothly transported into the interior of basket 3 from the inlet 14 by the action of the helical sheet-metal strips 7'. The granules are centrifuged in a more or less intense manner against strainer basket 3 and are upwardly conveyed in a spiral path by blades 7 to a discharge unit 15 at the top. Discharge unit 15 is connected to a discharge hood 16 which is attached to jacket 1 by quick release seals 17. The discharge hood 16 rests on annular disk 6 via with a gasket 18. A fan 19 equipped with ejector blades 21 is arranged in discharge hood 16 for assisting radial discharge of the now dry granules to unit 15. Fan 19 is detachably attached to cover 13 of rotor 2 by means of bolts 20. A rapid centering of fan 19 is possible, when this fan is changed, by means of conical centering pins 26 provided in cover 13 which engage in corresponding recesses or cores in fan 19. Ejector blades 21 of fan 19 extend radially at the periphery in rearwardly curved manner, relative to the direction of rotation of the fan 19, for the purpose of reducing noise and exercising a considerable influence on the pressure in the dryer, as a function of the outer diameter of the blades. If the outer diameter of the ejector blades 21 is greater than the outer diameter of the conveyor blades 7 of rotor 2, as is shown in FIGS. 1 and 2, then a relatively high suction pressure is produced in the dryer, which is effective at the inlet region of the dryer. In this way, a smooth drying is produced for the most part in an air current with high throughput.

If the ejector blades 21 are reduced in diameter and lengthened radially inwards, as shown in FIGS. 3 and 4, a flow is produced in the central region of the dryer, which decreases the rapid transport of the granules in the dryer. In this way a longer residence time is produced for the granules in the dryer along with a higher centrifugal action on the granules. Thereby, relatively wet granules can be maximally dried without changing the rotor 2. When the fan 19 is changed, corresponding to the desired outer diameter and radial length of the ejector blades, a strong suction effect (larger diameter) or the buildup of a counter-pressure (smaller diameter) can be realized rapidly and simply in the dryer.

For fine tuning of the fan pressure, the width of an air input 22 for fan 19 can be changed by turning set screws 23 and raising or lowering cover 24 to change the distance between cover 24 and an upper cylindrical portion 27 of hood 16.

FIG. 3 shows how the lowermost conveyor blades 7 of rotor 2 are provided with the sheet-metal strips 7' extending in helical manner to the lower boundary edge of rotor 2. In this way it is reliably established that the granules which have entered through product inlet 14 fall onto the sheet-metal strips 7' and are transported by their helical formation reliably up to the conveyor blades 7, independently of their moisture content, and the granules are then conveyed upwardly for discharge by conveyor blades 7. A comminution of the impact-sensitive product between lower conveyor blades 7 and base 4 is also avoided in this way. The residence time can therefore be adapted to various granule products by rapidly changing fan 19 with one having different ejector blade dimensions.

In order to facilitate the raising and lowering of discharge hood 16, the latter is equipped with rings 28.

From the above, it is evident that the drying property of the centrifugal dryer can be adjusted particularly to change the residence time of the plastic granules in the dryer by connecting a selected fan 19 in the discharge unit 15. This is made especially convenient by the quick release means 17 which allows the discharge hood 16 to be disconnected from the jacket 1 thereby enabling the fan 19 to be quickly replaced by the releasable connecting bolts 20 and the alignment pins 26. Consequently, by easy replacement of the fan, the residence time of the granules in the dryer can be adjusted without modifying the rotor 2 or the blades 7 thereon.

Although the invention has been described in relation to specific embodiments thereof, it will become apparent to those skilled in the art that numerous modifications and variations can be made within the scope and spirit of the invention as defined in the attached claims.

What is claimed:

1. A centrifugal dryer for separation of surface water from plastic granules comprising a vertically arranged tubular housing, a rotor rotatably supported vertically in said housing, a strainer basket surrounding said rotor, conveyor blade means on the rotor for conveying moist plastic granules upwardly in the housing, a lower product inlet in said housing to supply moist plastic granules to the conveyor blade means, a product discharge unit at the top of the housing for discharge of dried granules to a product outlet, a plurality of fans each having respective conveyor blade, means for releasably connecting a respective fan to the rotor within said product discharge unit, said product discharge unit having adjustable air input slot means for regulating air flow into the product discharge unit, said conveyor blades of the plurality of fans having properties of length and outer diameter which are different for different blades so that by connection of a selected fan in said product discharge unit by the releasable connecting means different pressure changes can be produced in the dryer for the same rotor whereby to change the residence time of the plastic granules in said housing.

2. A centrifugal dryer as claimed in claim 1, wherein said conveyor blades on said fan extend radially of said fan.

3. A centrifugal dryer as claimed in claim 2, wherein said conveyor blade means on said fan are disposed above said conveyor blade means on said rotor.

4. A centrifugal dryer as claimed in claim 3, wherein said conveyor blade means on said rotor comprises a plurality of blade members on the periphery of said rotor arranged one above the other.

5. A centrifugal dryer as claimed in claim 4, wherein said conveyor blades on said fan extend radially outward of the blade members on said rotor.

6. A centrifugal dryer as claimed in claim 5, wherein the lowermost ones of said blade members on the rotor are connected to respective strip members extending helically from said lowermost ones of said blade members to a lower end wall of the rotor.

7. A centrifugal dryer as claimed in claim 4, wherein said conveyor blades on said fan and the blade members on the rotor have the same outer diameter, said conveyer blades on said fan having a greater radial length than that of said blade members on the rotor.

8. A centrifugal dryer as claimed in claim 4, wherein said product discharge unit comprises a jacket in which said fan is enclosed, and quick release means for sealably connecting said jacket to said housing.

9. A centrifugal dryer as claimed in claim 8, wherein said means for releasably connecting the fan to the rotor comprises alignment pins between the fan and rotor and bolt means releasably joining the fan and rotor.

10. A method for separating surface water from plastic granules comprising:

introducing wet granules from which surface water is to be removed at the bottom of a vertical rotor;

conveying the granules upwardly on the rotor by conveyor blades disposed around the periphery of the rotor one above the other;

separating water on the granules through a strainer basket surrounding the rotor by centrifugal action on the granules;

discharging the now dried granules at the top of the rotor into a hollow housing of a product discharge unit;

centrifugally urging the dried granules for discharge from the hollow housing by rotating a fan having ejector blades thereon within said housing; and producing a pressure change in the dryer by replacing the fan with one having ejection blades of different size while retaining said rotor and its conveyer blades whereby to change the residence time of the granules in the dryer.

11. A method as claimed in claim 10 wherein the different size of the ejector blades is obtained by providing blades of different diameter.

12. A method as claimed in claim 10, wherein the different size of the ejector blades is obtained by providing blades of different radial length.

13. A method as claimed in claim 10, comprising effecting the rotating of the fan about an axis coincident with the axe of rotation of the rotor.

* * * * *